(12) United States Patent
Wang et al.

(10) Patent No.: US 7,999,850 B2
(45) Date of Patent: Aug. 16, 2011

(54) VIDEO SIGNAL GENERATOR

(75) Inventors: Chih Hung Wang, Cingshuei Township, Taichung County (TW); Chao Ning Chan, Jhubei (TW); Yu Teng Lin, Zihguan Township, Kaohsiung County (TW)

(73) Assignee: Cybervision, Inc., Chu-Pei, Hsin-Chu Hsien (TW)

( * ) Notice: Subject to any disclaimer, the term of this patent is extended or adjusted under 35 U.S.C. 154(b) by 1431 days.

(21) Appl. No.: 11/454,434

(22) Filed: Jun. 16, 2006

(65) Prior Publication Data
US 2007/0260414 A1 Nov. 8, 2007

(30) Foreign Application Priority Data
May 3, 2006 (TW) .............................. 95115691 A

(51) Int. Cl.
*H04N 17/00* (2006.01)
(52) U.S. Cl. ......................................................... 348/181
(58) Field of Classification Search .................. 348/180, 348/181, 184, 187–192, 177
See application file for complete search history.

(56) References Cited

U.S. PATENT DOCUMENTS

| | | | | |
|---|---|---|---|---|
| 5,706,002 | A * | 1/1998 | Meehan et al. ................. | 341/67 |
| 5,731,839 | A * | 3/1998 | Panaro ..................... | 375/240.15 |
| 6,057,882 | A * | 5/2000 | van den Branden Lambrecht et al. ........... | 348/192 |
| 6,230,295 | B1 * | 5/2001 | Watkins ....................... | 714/742 |
| 6,400,400 | B1 * | 6/2002 | Isnardi et al. ................. | 348/180 |
| 6,684,357 | B2 * | 1/2004 | Im ................................. | 714/732 |
| 7,136,092 | B2 * | 11/2006 | Whitehouse .................. | 348/182 |
| 7,230,417 | B2 * | 6/2007 | Chung et al. ............. | 324/757.01 |
| 7,363,033 | B2 * | 4/2008 | Moller et al. ................ | 455/425 |
| 7,391,434 | B2 * | 6/2008 | Yang ............................. | 348/181 |
| 7,817,184 | B1 * | 10/2010 | Michener et al. ............ | 348/189 |
| 2004/0102187 | A1 * | 5/2004 | Moller et al. ................ | 455/418 |
| 2006/0122814 | A1 * | 6/2006 | Beens et al. .................. | 702/189 |

* cited by examiner

*Primary Examiner* — Paulos M Natnael

(57) ABSTRACT

A video signal generator, employing a multi-output amplifier and a video signal connector, is physically connected to a device under test to eliminate the use of signal cables, to solve the impedance matching issue, and to reduce noise from the signal cables' exposure to high temperatures. Moreover, the video signal generator employs a video algorithm stored in a programmable microprocessor and instructions downloaded to provide on-line adjustable video patterns sets for test. The video signal generator includes the programmable microprocessor, a television encoder, a multi-output amplifier, and a video signal connector.

15 Claims, 3 Drawing Sheets

VIDEO SIGNAL GENERATOR

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a video signal generator, and more particularly, to a video signal generator with adjustable video patterns, which is especially suitable for the video signal test of digital video recorders (DVRs) in mass production.

BACKGROUND OF THE INVENTION

In mass production of DVRs, how to economically and rapidly provide different video signals to each DVR for burn-in becomes an important topic at the test stage. The burn-in for the DVR means the video signals with different compression ratios are fed, e.g., in a high-temperature environment, into the DVR to increase the load of the DVR during the test stage. The burn-in confirms the DVR can operate stably in such high-temperature environments. The high-temperature environment is created, in general, in an oven with the temperature ranging from 40° C. to 50° C. In addition, the conditions of the burn-in change depending on customers' requests; for example, whether the DVR can endure a continuous seven-day-long burn-in at 50° C., or increasing the environmental temperature gradually (generally performed in a temperature-controlled oven) until the DVR shuts down. Also, the number of video signal input channels may vary, and four, eight, or sixteen video signal input channels are commonly used.

FIG. 1 shows a conventional video signal system configured with sixteen video signal input channels, which comprises five amplifiers (one is a first amplifier 11 and the other four are second amplifiers 13), and twenty-one signal cables $C_1$-$C_{21}$. Each amplifier (11 or 13) has one input port and four output ports. First, a video signal VA1 (obtained by a video capture equipment such as a video recorder, or a monitor) is transmitted through a signal cable $C_1$ to the first amplifier 11. Then, the video signal $VA_1$ is divided into four video signals $VA_{1-1}$-$VA_{1-4}$. The four video signals $VA_{1-1}$-$VA_{1-4}$ are transmitted through four signal cables $C_2$-$C_5$ to the four second amplifiers 13 as input signals, respectively. Next, sixteen video signals $VA_{2-1}$-$VA_{2-16}$ from the four second amplifiers 13 are transmitted through sixteen signal cables $C_6$-$C_{21}$ to a device under test (e.g., DVR). If the DVR under test has sixteen video signal input channels, the video signals provided by the video signal system of FIG. 1 can only meet one DVR's requirement. If ten DVRs need to be tested at the same time, the layout of the signal cables will be complicated and chaotic (at least 210 signal cables and 40 amplifiers required). Therefore, the conventional video signal system of FIG. 1, used at the test stage in mass production, will result in the problems as follows. First, when numerous DVRs under test need to be tested simultaneously, incorrect wiring of the numerous signal cables occurs easily. Second, much human effort is needed to correctly connect the signal cables to the corresponding DVR under test. Third, the layout of the signal cables in FIG. 1 is prone to cause an impedance matching issue and thus, distorted video signals. Fourth, when numerous DVRs under test need to be tested simultaneously, they are placed in a large temperature-controlled room. In general, the manufacturers of DVRs rent the large temperature-controlled room from an external research institute; for example, a certified laboratory in the Industrial Technology Research Institute of Taiwan. In the rented room, complicated and messy signal cables are absolutely not allowed. Fifth, the video signals in the signal cables are affected by high temperature (about from 40° C. to 50° C.) during burn-in, and accordingly, the test result is affected. Sixth, to meet different customers' requirements, different video patterns have to be available. Even for a single customer, video patterns with various complex degrees are required to perform the burn-in process; for example, video patterns with various compression ratios. If the conventional video signal system of FIG. 1 is used, the source (e.g., a monitor) of the video signal $VA_1$ has to change and thus, it is very inconvenient to perform the burn-in process in such a large temperature-controlled room.

To solve the above problems, it is necessary to develop a video signal generator providing adjustable video patterns to rapidly and economically perform video signal testing of DVRs.

BRIEF SUMMARY OF THE INVENTION

A objective of the present invention is to provide a video signal generator, which employs a multi-output amplifier and a video signal connector. The video signal generator is detachable and physically connected to a device under test to eliminate the use of signal cables, to solve the impedance matching issue, and to reduce the noises from signal cables exposed to high temperature.

Another objective of the present invention is to provide a video signal generator using a video algorithm stored in a programmable microprocessor to provide on-line adjustable video pattern sets for testing.

In order to achieve the objectives, the present invention discloses a video signal generator comprising a programmable microprocessor, a television (TV) encoder, a multi-output amplifier and a video signal connector. The programmable microprocessor is used to store the video algorithm that generates a first digital video signal, where the programmable microprocessor comprises a memory to store plural program codes (e.g., algorithms). The TV encoder is used to transform the first digital video signal to a first analog video signal. The multi-output amplifier is used to transform the first analog video signal to plural second analog video signals. The video signal connector detachably and physically connects to a device under test, and transmits the second analog video signals to the device under test.

BRIEF DESCRIPTION OF THE SEVERAL VIEWS OF THE DRAWINGS

The invention will be described according to the appended drawings.

DETAILED DESCRIPTION OF THE INVENTION

Figure 1:
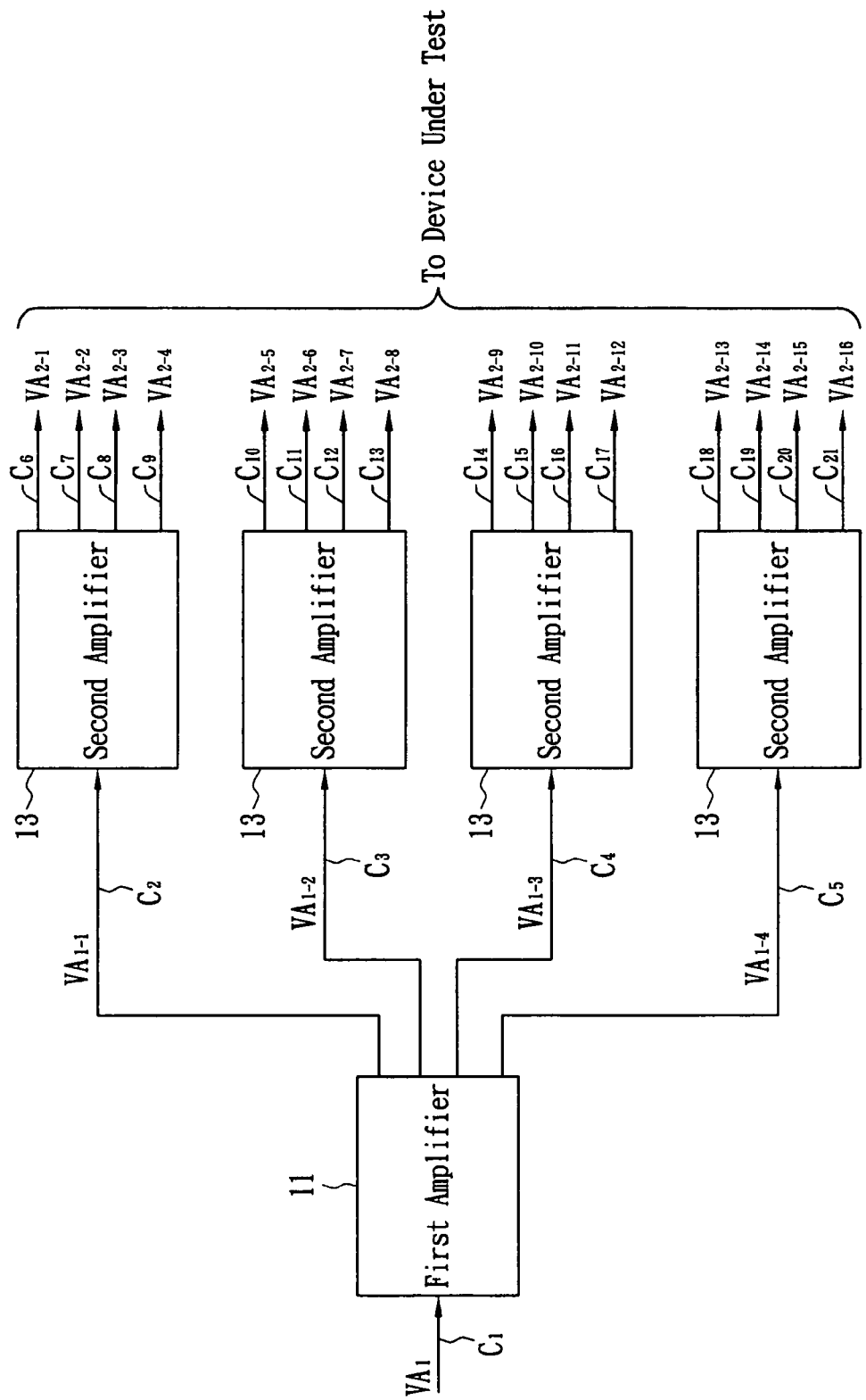
FIG. 1 shows a schematic view of a conventional video signal system configured with sixteen video signal input channels.
Figure 2:
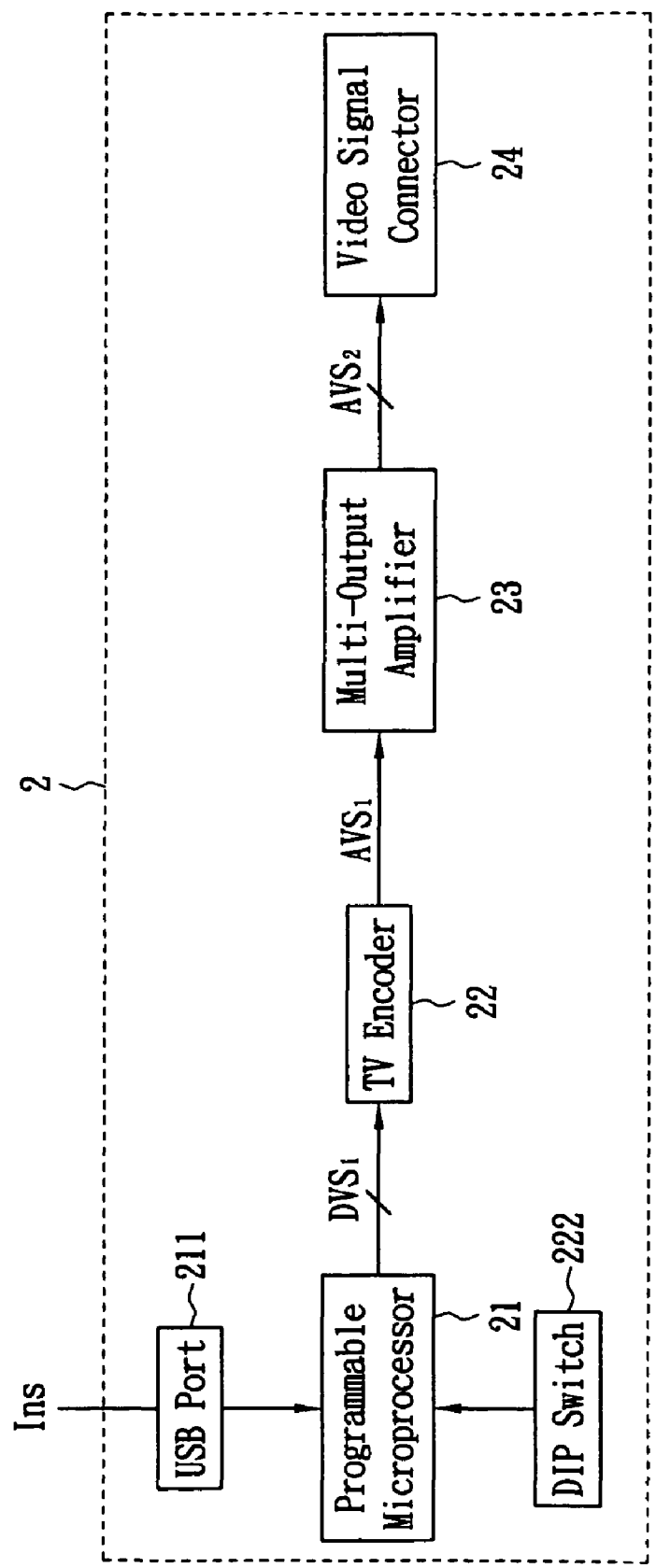
FIG. 2 is a schematic view of the functional block of the first embodiment of the video signal generator of the present invention.

FIG. 2 is the functional block of the first embodiment of the video signal generator 2 of the present invention. The video signal generator 2 comprises a programmable microprocessor 21, a TV encoder 22, a multi-output amplifier 23, a download port 211 (a USB port is used in the current embodiment), a pattern switch 222 (a DIP switch is used in the current embodiment), and a video signal connector 24. The programmable microprocessor 21 is used to store a video algorithm that can generate a first digital video signal $DVS_1$. The programmable microprocessor 21 is selected from the group consisting of a single-chip microprocessor (e.g., an 8051 microcontroller), a digital signal processor chip, or an FPGA (field programmable gate array). The video algorithm can be modified using instructions Ins downloaded through the download port 211 and therefore, the video patterns associated with the first digital video signal $DVS_1$ are modified, wherein the download port 211 is electrically connected to the programmable microprocessor 21. The programmable microprocessor 21 also preloads plural video pattern sets through the download port 211, and the pattern switch 222 selects one of the video pattern sets, which is directly sent to the TV encoder 22 without the processing of the video algorithm. Thus, adjustable video pattern sets are available on line for testing. The video pattern sets comprise RBG video patterns, random video patterns and color bar video patterns. The TV encoder 22 transforms the first digital video signal $DVS_1$ to a first analog video signal $AVS_1$. Then, the multi-output amplifier 23 transforms the first analog video signal $AVS_1$ to plural second analog video signals $AVS_2$. Afterwards, a video signal connector 24 with plural pins (e.g., a standard D-15 VGA Male connector) is used to transmit the second analog video signal AVS2 to a device under test (not shown). The video signal connector 24 is physically connected to the device under test and the video signal connector 24 is detachable from the device under test.

In the current embodiment, the device under test has eight video signal input channels. That is, the video signal generator 2 uses the video signal connector 24 to physically connect to the corresponding video signal input connector (e.g., a standard D-15 VGA Female connector) without the signal cables. Thus, noises due to signal cables being exposed to high temperature are reduced. Meanwhile, since the video signal generator 2 is physically connected to the device under test, both carried on the conveyer and moving together; that is, the video signal generator 2 of the present invention is portable.

Figure 3:
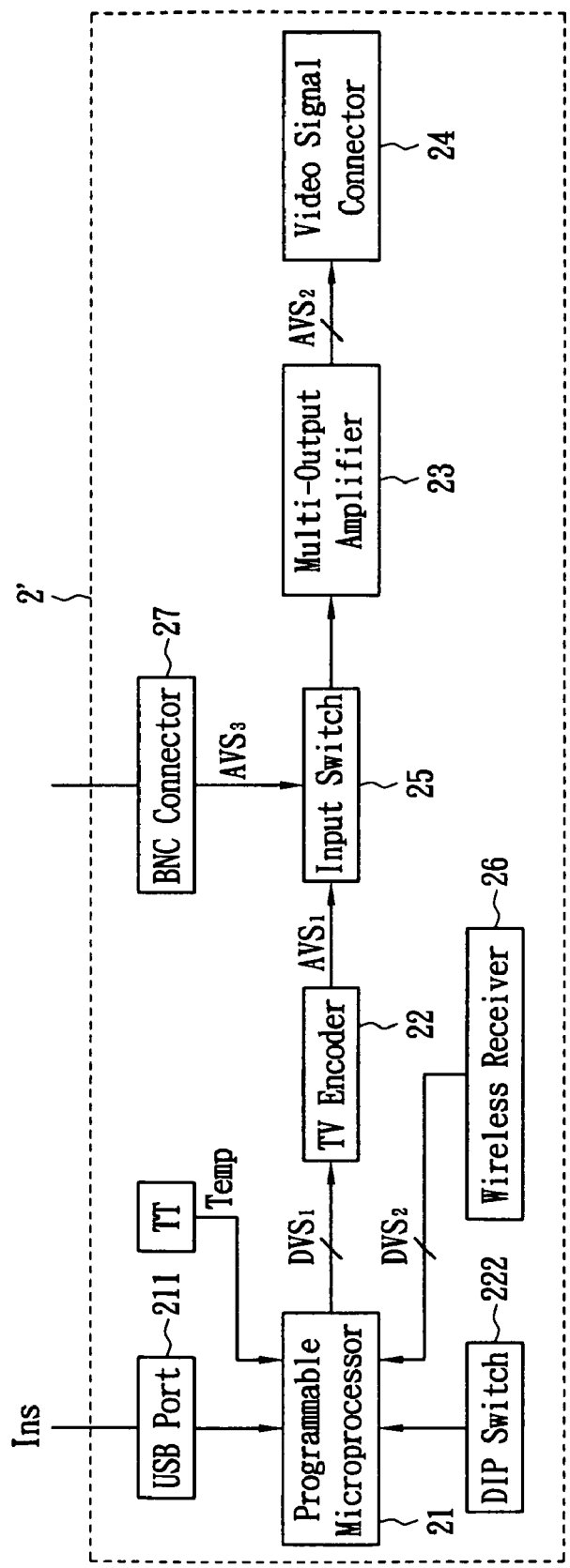
FIG. 3 is a schematic view of the functional block of the second embodiment of the video signal generator of the present invention.

FIG. 3 is the functional block of the second embodiment of the video signal generator 2' of the present invention. The video signal generator 2 comprises a programmable microprocessor 21, a TV encoder 22, a multi-output amplifier 23, a download port 211 (a USB port is used in the current embodiment), a pattern switch 222 (a DIP switch is used in the current embodiment), a video signal connector 24, a temperature sensor TT, a wireless receiver 26, an input switch 25 and an analog video signal input port 27 (a BNC (Bayonet Nut Coupling) connector is used in the current embodiment). To monitor the environmental temperature during burn-in, the temperature sensor TT senses a temperature signal Temp and sends it to the programmable microprocessor 21, then the programmable microprocessor 21 transforms the temperature signal Temp to digital form and adds the digital form thereof to the first digital video signal $DVS_1$. Thus, the temperature information can be displayed on a monitor (not shown) and connected to the device under test, for technician's reference.

Sometimes, the client requests the ability to check the video quality, which is shown by the device under test, resulting not only from the preloaded video pattern sets, but also from the video signals captured directly from outside. Consequently, the analog video signal input port 27 is used to receive a third analog video signal $AVS_3$ provided externally, which is then sent to the input switch 25. The input switch 25 is connected between the TV encoder 22 and the multi-output amplifier 23. Either the first analog video signal $AVS_1$ or the third analog video signal $AVS_3$, which is selected by the input switch 25, is sent to the multi-output amplifier 23. To analyze the testing result of the device under test, some key parameters, such as the current system temperature, the system compression ratio, the elapsed time after burn-in . . . etc., are recorded. Therefore, the status of the shutdown device is known from the video patterns associated with the key parameters. To provide a simple and convenient video signal source, the wireless receiver 26 is used to receive a second digital video signal $DVS_2$.

After being processed by the programmable microprocessor 21, the second digital video signal $DVS_2$ is then sent to the TV encoder 22. The wireless receiver 26 is in compliance with the Wi-Fi protocol, the Bluetooth protocol, or the GSM (global system for mobile communication) protocol. In other embodiments, the analog video signal input port 27 is an RCA type connector or an F type connector.

In the third embodiment, the temperature sensor TT of FIG. 3 is replaced with an external expansion circuit capable of connecting a thermometer, a hygrometer, or an accelerometer to sense an environment signal (i.e., a temperature signal, a humidity signal, or a vibration signal). The environment signal is sent to the programmable microprocessor as a key parameter.

Without external signal cables connected between the device under test and the multi-output amplifier, the video signal generator of the present invention can operate in a large temperature-controlled room (from approximately 40° C. to 65° C.) and eliminate distorted video signals due to exposure of the signal cables to high temperature as in the prior art. The video signal generator of the present invention employs a video signal connector detachably and physically connected to a device under test. Thus, no complicated signal cables are required and the impedance matching issue is resolved. Additionally, a video algorithm, stored in a programmable microprocessor, provides on-line adjustable video pattern sets for testing. According to the above description, the video signal generator of the present invention could achieve the expected objectives.

The above-described embodiments of the present invention are intended to be illustrative only. Numerous alternative embodiments may be devised by those skilled in the art without departing from the scope of the following claims.

We claim:

1. A video signal generator comprising:
a programmable microprocessor storing a video algorithm for generating a first digital video signal;
a television encoder transforming the first digital video signal into a first analog video signal;
a multi-output amplifier transforming the first analog video signal into a plurality of second analog video signals;
a video signal connector for physically connecting to a device under test and transmitting the second analog video signals to the device under test;

an analog video signal input port and an input switch to receive a third analog video signal provided externally, said input switch being connected between said television encoder and said multi-output amplifier, said analog video signal input port being connected to said input switch.

2. The video signal generator of claim 1, further comprising:
a download port connected to the programmable microprocessor to download instructions to modify the video algorithm.

3. The video signal generator of claim 1, further comprising:
a wireless receiver receiving a second digital video signal and transmitting the second digital video signal to said programmable microprocessor.

4. The video signal generator of claim 3, wherein said wireless receiver is in compliance with a Wi-Fi protocol.

5. The video signal generator of claim 3, wherein said wireless receiver is in compliance with Bluetooth protocol.

6. The video signal generator of claim 3, wherein said wireless receiver is in compliance with a GSM protocol.

7. The video signal generator of claim 1, further comprising:
an external expansion circuit for transmitting an environment signal to said programmable microprocessor.

8. The video signal generator of claim 7, wherein the environment signal is a temperature signal.

9. The video signal generator of claim 7, wherein the environment signal is a vibration signal or a humidity signal.

10. The video signal generator of claim 1, wherein said programmable microprocessor preloads a plurality of video pattern sets.

11. The video signal generator of claim 10, further comprising:
a pattern switch for selecting and sending one of the video pattern sets to said television encoder.

12. The video signal generator of claim 10, further comprising:
a download port connected to said programmable microprocessor so as to preload the video pattern sets.

13. The video signal generator of claim 10, wherein the video pattern sets comprise RGB video patterns, random video patterns, and color bar video patterns.

14. The video signal generator of claim 1, wherein said programmable microprocessor is a field programmable gate array.

15. The video signal generator of claim 1, wherein the programmable microprocessor is a single-chip microprocessor.

* * * * *